US008453441B2

(12) United States Patent
Williamson et al.

(10) Patent No.: US 8,453,441 B2
(45) Date of Patent: Jun. 4, 2013

(54) SYSTEM AND METHOD FOR PUMP-CONTROLLED CYLINDER CUSHIONING

(75) Inventors: Christopher Alan Williamson, West Lafayette, IN (US); Monika Marianne Ivantysynova, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 828 days.

(21) Appl. No.: 12/613,130

(22) Filed: Nov. 5, 2009

(65) Prior Publication Data

US 2010/0115936 A1 May 13, 2010

Related U.S. Application Data

(60) Provisional application No. 61/111,748, filed on Nov. 6, 2008.

(51) Int. Cl.
*F16D 31/02* (2006.01)
*F15B 15/22* (2006.01)
*F01B 31/12* (2006.01)

(52) U.S. Cl.
USPC ........... 60/446; 60/328; 60/476; 91/1; 91/399

(58) Field of Classification Search
USPC .................. 60/328, 446, 473, 476; 91/1, 361, 91/399, 403, 405; 92/5 R, 85 B
See application file for complete search history.

(56) References Cited

U.S. PATENT DOCUMENTS 4,033,250 A * 7/1977 Pinkstaff ......................... 91/405
4,896,582 A * 1/1990 Tordenmalm et al. .......... 91/361
5,138,838 A * 8/1992 Crosser ........................... 60/461
5,329,767 A 7/1994 Hewett (Continued)

FOREIGN PATENT DOCUMENTS

| | | |
|---|---|---|
| DE | 10303360 | 8/2004 |
| EP | 0849406 | 6/1998 |
| WO | 2004067969 | 8/2004 |

OTHER PUBLICATIONS

Zimmerman and Ivantysynova; The Effect of System Pressure Level on the energy Consumption of Displacement Controlled Actuator Systems; Published at Conference in Krakou, Poland, Jul. 2008.

(Continued)

*Primary Examiner* — Michael Leslie
(74) *Attorney, Agent, or Firm* — Hartman Global IP Law; Gary M. Hartman; Domenica N.S. Hartman

(57) ABSTRACT

A system and method for controlling the movement of an implement of an earthmoving machine. The system includes a hydraulic actuator adapted to move the implement. A variable displacement pump is coupled to the actuator for delivering a pressurized fluid to and receiving pressurized fluid from chambers within the actuator. A sensor generates an output based on the position of the actuator's piston or piston rod, and a controller controls the displacement of the variable displacement pump in response to the output of the sensor by executing an algorithm to reduce the flow rate of the fluid to and from the actuator's chambers and thereby reduce the velocity of the piston as it approaches an end of a piston stroke thereof and prevent the piston from impacting the actuator at the end of the piston stroke.

20 Claims, 2 Drawing Sheets

U.S. PATENT DOCUMENTS

| | | | | |
|---|---|---|---|---|
| 5,511,458 | A | 4/1996 | Kamata et al. | |
| 5,571,226 | A | 11/1996 | Kobayashi | |
| 7,543,449 | B2 | 6/2009 | Ivantysynova et al. | |
| 2006/0104786 | A1 | 5/2006 | Shepherd et al. | |
| 2007/0130928 | A1 | 6/2007 | Price | |
| 2007/0144165 | A1 * | 6/2007 | Kobata et al. | 60/459 |

OTHER PUBLICATIONS

Williamson, Zimmerman, Ivantysynova; Efficiency Study of an Excavator Hydraulic System Based on Displacement-Controlled Actuators; Published at Conference in Bath, UK, Sep. 2008.

* cited by examiner

SYSTEM AND METHOD FOR PUMP-CONTROLLED CYLINDER CUSHIONING

CROSS REFERENCE TO RELATED APPLICATIONS

This application claims the benefit of U.S. Provisional Application No. 61/111,748, filed Nov. 6, 2008, the contents of which are incorporated herein by reference.

BACKGROUND OF THE INVENTION

The present invention generally relates to systems for operating hydraulic circuits. More particularly, this invention relates to a system and method for pump-controlled cushioning of a hydraulic actuator used to control the position of a working implement on a mobile machine.

Compact excavators, wheel loaders and skid-steer loaders are examples of multi-function machines whose operations involve controlling movements of various implements of the machines. FIG. 1 illustrates a compact excavator 100 as having a cab 101 mounted on top of an undercarriage 102 via a swing bearing (not shown) or other suitable device. The undercarriage 102 includes tracks 103 and associated drive components, such as drive sprockets, rollers, idlers, etc. The excavator 100 is further equipped with a blade 104 and an articulating mechanical arm 105 comprising a boom 106, a stick 107, and an attachment 108 represented as a bucket, though it should be understood that a variety of different attachments could be mounted to the arm 105. The functions of the excavator 100 include the motions of the boom 106, stick 107 and bucket 108, the offset of the arm 105 during excavation operations with the bucket 108, the motion of the blade 104 during grading operations, the swing motion for rotating the cab 101, and the left and right travel motions of the tracks 103 during movement of the excavator 100. In the case of a compact excavator 100 of the type represented in FIG. 1, the blade 104, boom 106, stick 107, bucket 108 and offset functions are typically powered with linear actuators 109-114 (represented as hydraulic cylinders in FIG. 1), while the travel and swing functions are typically powered with rotary hydraulic motors (not shown in FIG. 1).

On conventional excavators, the control of these functions is accomplished by means of directional control valves. However, throttling flow through control valves is known to waste energy. In some current machines, the rotary functions (rotary hydraulic drive motors for the tracks 103 and rotary hydraulic swing motor for the cabin 101) are realized using displacement control (DC) systems, which notably exhibit lower power losses and allow energy recovery. In contrast, the position and velocity of the linear actuators 109-114 for the blade 104, boom 106, stick 107, bucket 108, and offset functions typically remain controlled with directional control valves. It is also possible to control linear hydraulic actuators directly with hydraulic pumps. Several pump-controlled configurations are known, using both constant and variable displacement pumps. Displacement control of linear actuators with single rod cylinders has been described in U.S. Pat. No. 5,329,767 or German Patents DE000010303360A1, EP000001588057A1 and WO002004067969, and offers the possibility of large reductions in energy requirements for hydraulic actuation systems. Other aspects of using displacement control systems can be better appreciated from further reference to Zimmerman et al., "The Effect of System Pressure Level on the Energy Consumption of Displacement Controlled Actuator Systems," Proc. of the 5th FPNI PhD Symposium, Cracow, Poland, 77-92 (2008), and Williamson et al., "Efficiency Study of an Excavator Hydraulic System Based on Displacement-Controlled Actuators," Bath ASME Symposium on Fluid Power and Motion Control (FPMC2008), 291-307 (2008), whose contents are incorporated herein by reference.

Hydraulic actuators have a limited position range, or stroke. When the piston of the actuator reaches either end of its stroke, the piston assembly makes contact with the cylinder body and stops. Without some form of cushioning, the impact between the piston and cylinder can cause undesirable wear, vibration and operator discomfort. For some machines, other safety problems such as vehicle instability may result from a sudden actuator stop. To prevent these problems, hydraulic actuators are commonly equipped with viscous dampers called "cushions" that slow the actuator piston near the end of its stroke by forcing the hydraulic fluid through small orifices. If an actuator is not equipped with a cushion, the operator must manually control the actuator velocity to avoid an end-of-stroke impact. However, manually regulating the actuator velocity requires skill and attention.

BRIEF DESCRIPTION OF THE INVENTION

The present invention provides a system and method for cushioning pump-controlled hydraulic actuators that do not require the use of a fluid component such as a viscous damper. The system is particularly well suited for automatically controlling the position and velocity of a hydraulic cylinder used to control the movement of an implement of an earthmoving machine.

According to a first aspect of the invention, the system includes a hydraulic actuator adapted to move the implement. The actuator includes a piston that defines first and second chambers within the actuator and a piston rod coupled to the piston and to the implement. A variable displacement pump is coupled to the actuator for delivering a pressurized fluid to and receiving pressurized fluid from the chambers of the actuator. A sensor generates an output based on the position of the piston or the piston rod of the actuator. A controller controls the displacement of the variable displacement pump in response to the output of the sensor, wherein the controller is operable to execute an algorithm to reduce the flow rate of the fluid to the first chamber and from the second chamber of the actuator and thereby reduce the velocity of the piston of the actuator as the piston approaches an end of a piston stroke thereof within the actuator and prevent the piston from impacting the actuator at the end of the piston stroke.

According to a second aspect of the invention, the method includes using a variable displacement pump to deliver a pressurized fluid to and receive pressurized fluid from first and second chambers of a hydraulic actuator adapted to move the implement. The actuator comprises a piston that defines the first and second chambers and a piston rod coupled to the piston and to the implement. An output is generated based on the position of the piston or the piston rod of the actuator, and the displacement of the variable displacement pump is controlled in response to the output by reducing the flow rate of the fluid to the first chamber and from the second chamber of the actuator and thereby reduce the velocity of the piston as the piston approaches an end of a piston stroke thereof within the actuator and prevent the piston from impacting the actuator at the end of the piston stroke.

Another aspect of the invention is an earthmoving machine equipped with the system described above.

In view of the above, it can be seen that significant advantages of this invention include the ability to provide a cushioning effect without physically implementing conventional actuator cushions such as viscous dampers within the hydraulic circuit, and energy savings as a result of eliminating the need to throttle flow through directional control valves. Another advantage is the option for providing adjustment of the cushioning function based on the stroke position at which velocity of the actuator begins to slow and/or the rate of deceleration of the actuator, thereby providing greater flexibility for satisfying machine safety and operating requirements.

Other aspects and advantages of this invention will be better appreciated from the following detailed description.

DETAILED DESCRIPTION OF THE INVENTION

Figure 1:
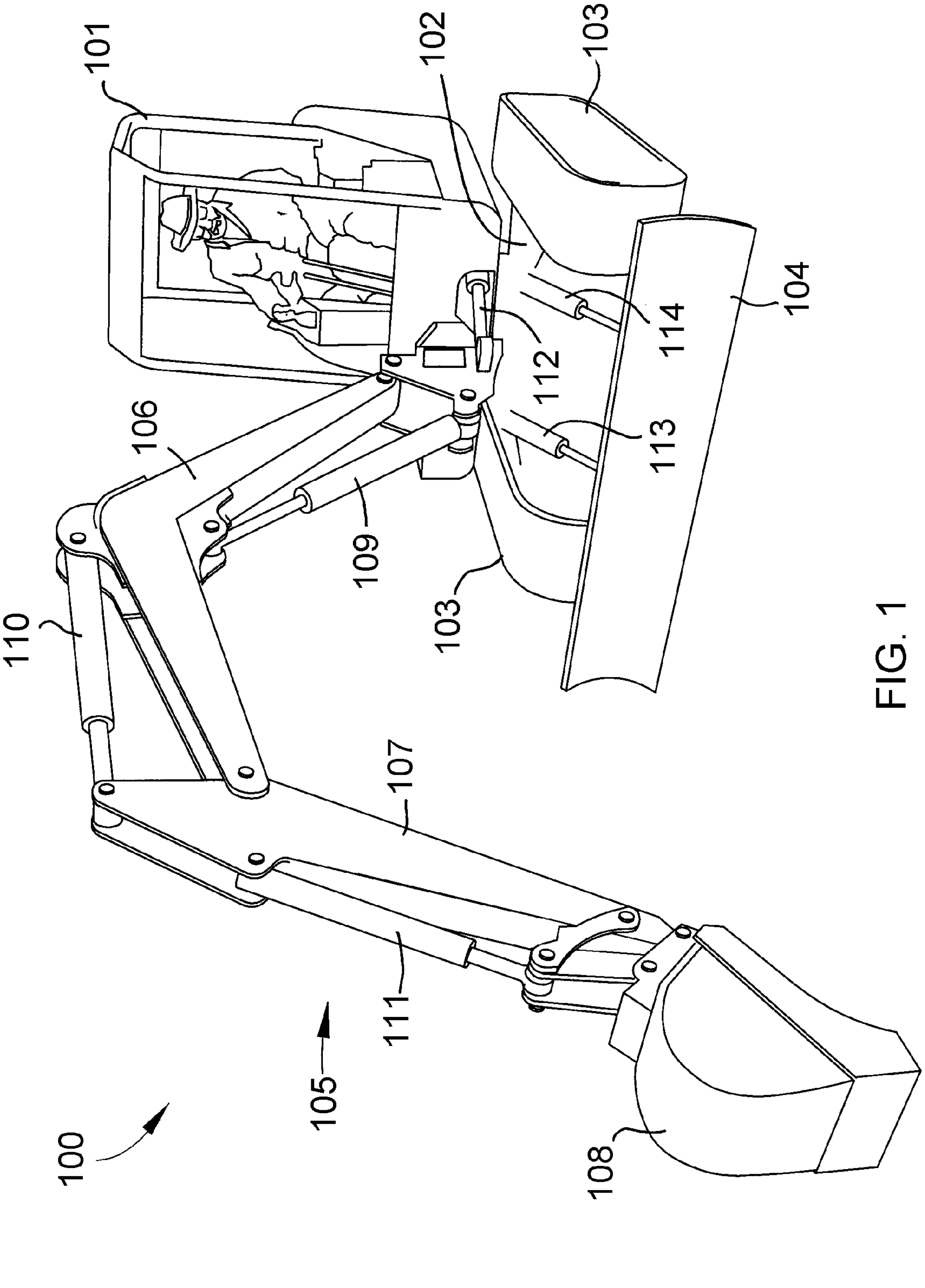
FIG. 1 schematically represents a compact excavator of a type known in the prior art.
Figure 2:
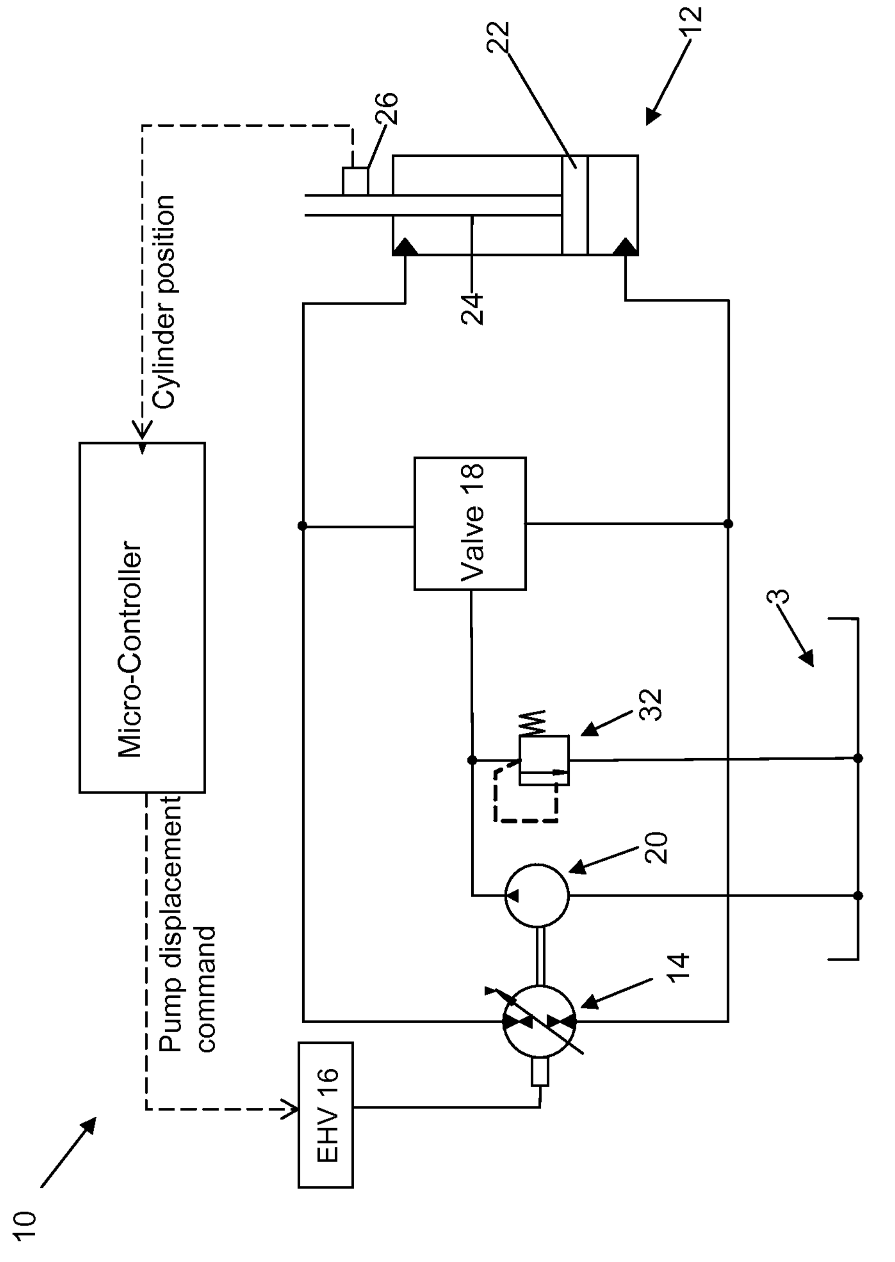
FIG. 2 represents a pump-controlled actuator circuit for cushioning pump-controlled hydraulic actuators of types used in the excavator of FIG. 1 in accordance with an embodiment of this invention.

FIG. 2 schematically represents a system 10 for automatically controlling the position and velocity of a pump-controlled hydraulic actuator 12. The system 10 is represented in FIG. 2 as comprising a closed hydraulic circuit containing a pump-controlled hydraulic actuator 12 adapted to control the movement of an implement of an earthmoving machine, non-limiting examples being any of the implements 104-108 of the excavator 100 of FIG. 1. As such, the actuator 12 can be exemplified by any of the linear actuators 109-114 of the excavator 100.

The system 10 of FIG. 2 further includes a variable displacement pump 14 connected to the hydraulic actuator 12, represented as a single-rod double-acting actuator. The pump 14 is powered by a primary power source (not shown), for example, an internal combustion engine. One or more valves 18 connect the hydraulic circuit to a suitable hydraulic fluid source, such as a charge pump 20 and reservoir 30 shown in FIG. 2, though the use of other sources including accumulators (not shown) is also foreseeable. The valve 18 compensates for the difference in volume between the two chambers of the actuator 12 separated by the actuator piston 22. This volumetric compensation may be achieved with a single spool-type valve (as disclosed in U.S. Pat. No. 5,329,767, incorporated herein by reference), two pilot-operated check valves, or some other way. Hydraulic fluid discharged from the valve 18 is returned to the reservoir 30 through a pressure relief valve 32.

FIG. 2 further shows a linear position sensor 26 adapted to monitor the position of the rod 24 of the actuator 12, from which the position of the actuator piston 22 can be determined. The sensor 26 can be of any suitable type capable of sensing the position of the rod 24 or a target on the rod 24. The signal generated by the sensor 26 is sent to a digital micro-controller 28, which controls the displacement of the hydraulic pump 14 via an electro-hydraulic valve 16 connected to a displacement controller (not shown) of the pump 14. When the actuator piston 22 is close to either end of its stroke, as determined by the sensor 26, the micro-controller 28 executes an algorithm to reduce the pump flow rate and thus the velocity of the piston 22. As such, the system 10 and method of this invention encompass slowing the actuator 12 to avoid a piston impact at the end of stroke, and not to a specific relationship between piston position and desired velocity (e.g., linear, quadratic, etc.).

In view of the above, the present invention can be seen to offer various advantages over the prior art. For example, the system 10 provides a cushioning effect without physically implementing conventional actuator cushions such as viscous dampers within the hydraulic circuit. The invention allows the same functionality as traditional actuator cushioning systems, but with reduced costs. Due to cost constraints, most mobile hydraulic machines do not have cushions on all actuators controlling the movement of a machine's implements, and actuator cushioning is often provided for one direction only, for example, only on the extension limit or the retraction limit, but not both. The present invention has the advantage of enabling all pump-controlled actuators to be cushioned in both directions, resulting in a machine that is easier and more comfortable to operate.

Actuator cushioning can also be readily adjustable with the present invention. In the prior art, the stroke position at which an actuator slows and the rate of deceleration are fixed by design, for example, the orifice size of a viscous damper that slows the actuator piston near the end of its stroke. The present invention allows the stroke position at which velocity of the actuator 12 begins to slow and the rate of deceleration of the actuator 12 to be adjusted through inputs to the micro-controller 28 according to machine type, operating task, operator preference, or some other variable of interest. In this way, the invention can provide greater flexibility for satisfying machine safety and operating requirements.

The invention also offers the advantage of energy savings. Traditional cylinder controls allow pressurized fluid to be supplied to an actuator even after it reaches a stroke limit. The fluid is then throttled to a reservoir by a pressure relief valve, wasting energy and generating heat. The present invention reduces energy usage by reducing flow to the actuator 12 when the piston 20 has reached a stroke limit, instead of throttling excess flow.

While the invention has been described in terms of a specific embodiment, it is apparent that other forms could be adopted by one skilled in the art. For example, if the actuator 12 forms a closed kinematic loop with the machine structure, an angular position sensor attached to any joint in the loop may be used instead of the linear position sensor 26 located at the actuator 12. Another possible alternative is a set of proximity sensors that detect the presence of the actuator piston 22 as the actuator stroke limit is reached, without continuously measuring the position of the piston rod 24 throughout its entire range. The invention is also applicable to a wide variety of machines with one or more implements whose movements are controlled by actuators. Accordingly, it should be understood that the invention is not limited to the specific embodiments illustrated in the FIGS. 1 and 2. Instead, the scope of the invention is to be limited only by the following claims.

The invention claimed is:

1. A system adapted to control the movement of an implement of an earthmoving machine, the system comprising:

a hydraulic actuator adapted to move the implement, the actuator comprising a piston that defines first and second chambers within the actuator and a piston rod coupled to the piston and to the implement;

a variable displacement pump for delivering a pressurized fluid to and receiving pressurized fluid from the chambers of the actuator;

a sensor adapted to detect the piston or the piston rod of the actuator and generate therefrom an output that corresponds to a stroke position of the piston within the actuator; and a controller that controls the displacement of the variable displacement pump in response to the output of the sensor, wherein the controller is operable to execute an algorithm to reduce the flow rate of the fluid from and to the variable displacement pump to thereby reduce the velocity of the piston of the actuator as the stroke position of the piston approaches an end of a piston stroke thereof within the actuator and prevent the piston from impacting the actuator at the end of the piston stroke.

2. The system according to claim 1, wherein the earthmoving machine is an excavator.

3. The system according to claim 2, wherein the implement comprises an articulating arm and an attachment thereto.

4. The system according to claim 2, wherein the implement comprises a blade.

5. The system according to claim 1, wherein the system lacks a viscous damper for reducing the flow rate of the fluid to and from the first and second chambers of the actuator.

6. The system according to claim 1, wherein the controller is adapted to enable adjustment of the stroke position of the piston at which the velocity of the piston is initially reduced and the rate at which the velocity of the piston is reduced as the piston approaches the end of the piston stroke.

7. The system according to claim 1, wherein the system is installed on the earthmoving machine.

8. The earthmoving machine equipped with the system of claim 7.

9. A method of controlling movement of an implement of an earthmoving machine, the method comprising:

using a variable displacement pump to deliver a pressurized fluid to and receive pressurized fluid from first and second chambers of a hydraulic actuator adapted to move the implement, the actuator comprising a piston that defines the first and second chambers and a piston rod coupled to the piston and to the implement;

detecting the piston or the piston rod of the actuator and generating therefrom an output that corresponds to a stroke position of the piston within the actuator; and controlling the displacement of the variable displacement pump in response to the output by reducing the flow rate of the fluid from and to the variable displacement pump to thereby reduce the velocity of the piston as the stroke position of the piston approaches an end of a piston stroke thereof within the actuator and prevent the piston from impacting the actuator at the end of the piston stroke.

10. The method according to claim 9, wherein the earthmoving machine is an excavator.

11. The method according to claim 9, wherein the implement comprises an articulating arm and an attachment thereto.

12. The method according to claim 9, wherein the implement comprises a blade.

13. The method according to claim 9, wherein the method does not utilize a viscous damper to reduce the flow rate of the fluid to and from the first and second chambers of the actuator.

14. The method according to claim 9, further comprising adjusting the stroke position of the piston at which the velocity of the piston is initially reduced and the rate at which the velocity of the piston is reduced as the piston approaches the end of the piston stroke.

15. The system according to claim 1, wherein the sensor is a linear position sensor located at the actuator.

16. The system according to claim 1, wherein the sensor is an angular position sensor.

17. The system according to claim 1, wherein the sensor is a proximity sensor that detects the presence of the piston as the stroke position of the piston approaches the end of a piston stroke thereof, and the proximity sensor does not continuously measure the position of the piston.

18. The method according to claim 9, wherein the detecting step comprises detecting the stroke position and generating the output with a linear position sensor.

19. The method according to claim 9, wherein the detecting step comprises detecting the stroke position and generating the output with an angular position sensor.

20. The method according to claim 9, wherein the detecting step comprises detecting the stroke position and generating the output with a proximity sensor that detects the presence of the piston as the stroke position of the piston approaches the end of a piston stroke thereof, and the proximity sensor does not continuously measure the position of the piston.

* * * * *